G. HARDING.
BABY CARRIAGE AND LIKE VEHICLE.
APPLICATION FILED JAN. 4, 1908.
994,077.
Patented May 30, 1911.
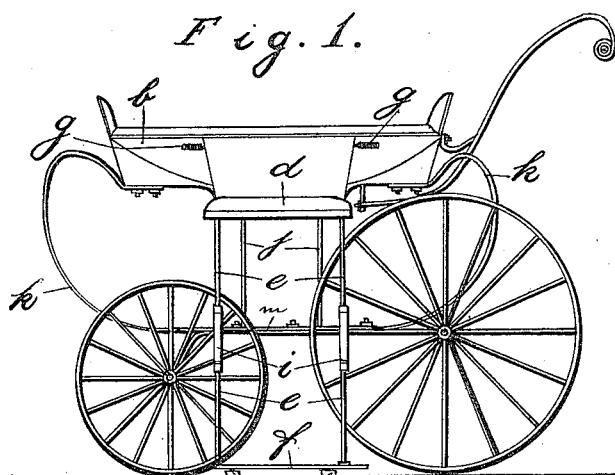
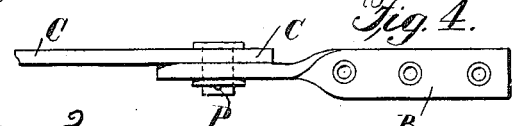
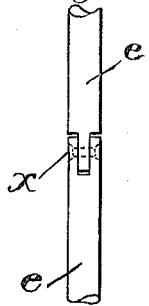
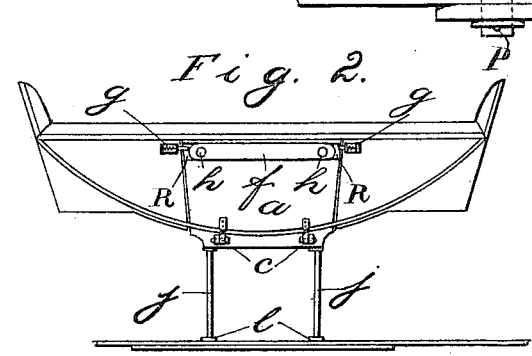
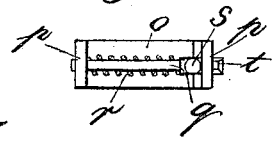
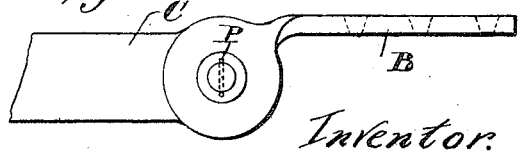
Witnesses.
Inventor.
George Harding

UNITED STATES PATENT OFFICE.

GEORGE HARDING, OF BUCKLAND, PORTSMOUTH, ENGLAND.

BABY-CARRIAGE AND LIKE VEHICLE.

994,077. Specification of Letters Patent. Patented May 30, 1911.

Application filed January 4, 1908. Serial No. 409,348.

*To all whom it may concern:*

Be it known that I, GEORGE HARDING, a subject of the King of England, and resident of Buckland, Portsmouth, England, have invented Improvements in Connection with Baby-Carriages and the Like Vehicles, of which the following is a specification.

This invention relates to improvements in connection with baby carriages and the like vehicles, the object being to provide a seat which can be let down or brought into use as and when required for the use of the mother or nurse in attendance on the child or children.

In carrying my invention into effect, I proceed in or in about the following manner, making reference to the accompanying drawing wherein:—

Figure 1 is a side view of the complete vehicle with the seat let down. Fig. 2 an enlarged side view of part of the vehicle with the seat shut up. Fig. 3 is a front view of a detail, and Figs. 4, 5 and 6 show detail views of the construction of the hinge as applied to several parts hereinafter described.

In order to put the invention into practice I cut out a portion $a$ of one side of the vehicle $b$ and hinge the bottom edge of the cut out part to rods $c$ by means of brackets B and pins P. The rods $c$ are screwed into the corresponding side of the bottom part of the vehicle, while the cut out part $a$ when folded down forms the padded seat $d$. Brackets B may also be attached to the front edge of the under side of the seat $d$ and hinged to these brackets, in a similar manner as the rods $c$, are two jointed legs $e$, the outer ends of which in turn are hinged to a plate $f$, also by means of brackets B. Each leg $e$ consists of two similar members pivotally connected at $x$ in such a way that they can be folded inwardly and partly into a recess R provided in the outer—respectively under—face of the cut out part $a$ in which they are held by spring catches $g$, knobs $h$ being provided on the plate $f$ to enable the seat to be more easily folded down.

The legs $e$ are kept rigid when open by ferrules or sleeves $i$ which can be slid over the joints in $e$ when they are straightened out.

Struts $j$ may be provided for supporting the seat, and keeping its weight off the springs $k$. The struts $j$ are hinged to the under part of the vehicle $b$ by means of brackets as shown in Figs. 4, 5 and when let down, the lower ends are slipped into recessed blocks $l$ provided on the side bar $m$ of the framing carrying the wheel. Any other form of collapsible legs may be employed if preferred, and any form of spring catch can be employed at $g$, the one shown in Fig. 3 being a simple and effective one. It consists of a base plate $o$ having upturned ends $p$, in which is free to slide a bolt $q$ surrounded by a spiral spring $r$ and furnished with a knob $s$ by which the normally protruding tongue $t$ can be drawn back when the seat is to be let down.

Having fully described my invention, what I claim and desire to secure by Letters Patent is:—

In a baby carriage, and the like vehicle, the combination of a vehicle, a cut out portion of the side of the vehicle forming the seat top, rods to which the cut out portion is hinged, two jointed and collapsible legs hinged to the seat, spring catches mounted on the side of the vehicle to keep the said seat in a closed position when the legs are partly folded into a recess provided in the face of the seat, and sleeves which can be slid over the joints in said legs so as to keep them rigid, substantially as described and shown and for the purpose set forth.

GEORGE HARDING.

Witnesses:
 H. BAVERSTOCK,
 CHARLES PACK.

Copies of this patent may be obtained for five cents each, by addressing the "Commissioner of Patents, Washington, D. C."